United States Patent
Benman

(10) Patent No.: US 7,755,635 B2
(45) Date of Patent: Jul. 13, 2010

(54) SYSTEM AND METHOD FOR COMBINING SATELLITE IMAGERY WITH VIRTUAL IMAGERY

(76) Inventor: William J. Benman, 2049 Century Park East, Suite 2740, Los Angeles, CA (US) 90067

( * ) Notice: Subject to any disclaimer, the term of this patent is extended or adjusted under 35 U.S.C. 154(b) by 482 days.

(21) Appl. No.: 11/710,078

(22) Filed: Feb. 23, 2007

(65) Prior Publication Data

US 2008/0043040 A1    Feb. 21, 2008

Related U.S. Application Data

(60) Provisional application No. 60/777,098, filed on Feb. 27, 2006.

(51) Int. Cl.
| | |
|---|---|
| G09G 5/00 | (2006.01) |
| G09G 5/02 | (2006.01) |
| G06K 9/00 | (2006.01) |
| G06K 9/36 | (2006.01) |
| G06F 15/16 | (2006.01) |
| G06F 3/00 | (2006.01) |
| G06F 17/00 | (2006.01) |

(52) U.S. Cl. .................. 345/582; 345/581; 345/632; 345/633; 345/619; 709/201; 709/204; 715/200; 715/700; 715/753; 715/756; 382/154; 382/285; 348/14.01

(58) Field of Classification Search .............. 345/632, 345/633–634, 581, 582–583, 418, 619; 709/201–204, 709/205, 248, 216–219; 382/154, 285; 715/200, 715/700, 716–719, 753, 756, 764, 231; 348/14.01, 348/14.08, 14.09, 14.1
See application file for complete search history.

(56) References Cited

U.S. PATENT DOCUMENTS

| | | | | |
|---|---|---|---|---|
| 5,966,130 | A | * | 10/1999 | Benman, Jr. ................ 345/418 |
| 6,798,407 | B1 | * | 9/2004 | Benman ..................... 345/419 |
| 2003/0086604 | A1 | * | 5/2003 | Oniyama .................... 382/154 |
| 2005/0283536 | A1 | * | 12/2005 | Swanson et al. ............ 709/232 |
| 2006/0087987 | A1 | * | 4/2006 | Witt et al. ................... 370/260 |
| 2006/0215024 | A1 | * | 9/2006 | Coonce et al. .............. 348/143 |
| 2007/0199076 | A1 | * | 8/2007 | Rensin et al. ................. 726/27 |
| 2008/0016145 | A1 | * | 1/2008 | Takase et al. ............... 709/203 |
| 2008/0091732 | A1 | * | 4/2008 | Schmidt et al. .......... 707/104.1 |
| 2008/0101221 | A1 | * | 5/2008 | Mallet ........................ 370/230 |

* cited by examiner

*Primary Examiner*—Wesner Sajous
(74) *Attorney, Agent, or Firm*—William J. Benman

(57) ABSTRACT

A system and method for combining computer generated 3D environments (virtual environments) with satellite images. In a specific application, the system enables users to see and communicate with each other as live avatars in the computer generated environment in real time.

8 Claims, No Drawings

SYSTEM AND METHOD FOR COMBINING SATELLITE IMAGERY WITH VIRTUAL IMAGERY

This Application claims priority from a Provisional Application entitled SYSTEM AND METHOD FOR COMBINING SATELLITE IMAGERY WITH VIRTUAL IMAGERY AND SILHOUETTE FUNCTIONALITY, filed Feb. 27, 2006 by William J. Benman, Ser. No. 60/777,098.

BACKGROUND OF THE INVENTION

1. Field of the Invention

This invention relates to computer graphics and video imagery. Particularly, this invention relates to satellite imagery and computer software used for viewing 3-dimensional objects.

2. Description of the Related Art

Satellite imagery is widely used for military, industrial, commercial and consumer applications. In such applications, satellite images provide a bi-level point-of-view to view geographical image data. Some companies are making satellite imagery available for viewing by consumers using a searchable database. One such company is Google. Google makes satellite images available using Google Earth™. With Google Earth, a user can type in a street address in one of several cities around the world and view satellite imagery of the selected location. See www.googleearth.com.

The view provided by Google Earth allows the user to zoom in on the location up to a maximum degree of magnification of the image. Unfortunately, inasmuch as there is no further magnification available of that image, the functionality of Google Earth is limited. For example, the limited magnification of the satellite image prevents one from seeing objects at street level.

Further, satellite images are not 3-dimensional. Consequently, it is not generally possible to navigate in an image provided by conventional satellite imaging systems. For certain applications, such navigation functionality may be desirable.

Finally, satellite images are generally static, not dynamic. And these images do not go forward or otherwise allow for cooperation between two or more users in a selected area or region of interest.

Hence, a need exists in the art for a system or method for combining satellite-generated images with computer generated images to allow for navigation and or communication in photo-realistic environments.

SUMMARY OF THE INVENTION

The need in the art is addressed by the present invention, which provides a system and method for combining computer generated 3D environments (virtual environments) with satellite images. In a specific application, the system enables users to see and communicate with each other as live avatars in the computer generated environment in real time.

DESCRIPTION OF THE INVENTION

Illustrative embodiments and exemplary applications will now be described to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

U.S. Pat. No. 6,798,407, SYSTEM AND METHOD FOR PROVIDING A FUNCTIONAL VIRTUAL ENVIRONMENT WITH REAL TIME EXTRACTED AND TRANSPLANTED IMAGES by William J. Benman, issued Sep. 28, 2004, and U.S. Pat. No. 5,966,130, INTEGRATED VIRTUAL NETWORKS by William J. Benman, issued Oct. 12, 1999, the teachings of both of which are incorporated herein by reference, disclose and claim systems for enabling users to see and interact with each other as live images in computer generated environments in real time. This technology is named Silhouette$^{SM}$ and is currently offered as a service via a highly realistic computer generated environment called the Nexos$^{SM}$ by Integrated Virtual Networks, Inc. of Los Angeles, Calif.

Textures for the 3D buildings within which users communicate with each other are currently rendered by designers on a case-by-case basis as is common in the art.

In accordance with the current teachings, textures for the buildings in 3D environments (such as the 'Nexos') and in the surrounding environment itself are provided by satellite images such as those provided by Google Earth. The satellite imagery is applied as a texture to the 3-dimensional wireframe by the graphic designer either manually or using an automated system. Street level graphic imagery is provided by a street level camera. In the best mode, a 360-degree viewing camera is used for this purpose. Those skilled in the art will appreciate that the camera may actually be in motion at the time that the view is taken to capture imagery as quickly and as inexpensively as possible at street level.

The street level images may be applied as textures to buildings that are not viewable by satellite from above. The combination of satellite imagery and street level imagery is effective to provide textures on the upper, horizontal and vertical faces of structures in the environment.

In one mode of operation, a user would type an address or name in a city within which a user wants to view and/or communicate with another user and the system will present satellite imagery of the selected city. In one continuous, smooth navigation, the satellite imagery is magnified to a maximum extent as per the current practice via Google Earth or some similar satellite image viewing application.

When the maximum magnification of the satellite image has been reached, the system switches automatically and seamlessly to 3D navigational mode using the last satellite image as the texture for the buildings in the area of interest stored in a database.

The user is brought to street level using the automatic navigation (viewpoint tour) functionality of the 3D browser such as is commonly known and used in the art. At street level, navigation is turned over to the user. At this point, the user may navigate into a selected building and enter the lobby area thereof. The interior buildings, having been rendered previously and provided on the Silhouette server, present a viewer with an interior environment. The interior environment may be identical to that of a building that exists in the real world or it may be a virtual representation of a building that does not exist. In any event, using the Silhouette technology taught by the above-referenced Benman patents, the user is able to navigate into a lobby area and speak with a receptionist and see her as a live image. The receptionist would be also able to see the visitor as a live image and talk to the visitor as well. The visitor may then travel further within the building, perhaps through a virtual elevator, such as that currently used in the Cybertown online community. (See www.cybertown.com.) After exiting the virtual elevator, the user might appear at another lobby area, interface with another receptionist, and be directed to the office of a person that the visitor is there to see as per a real life office visit scenario. Subsequently, the visitor can navigate into the office of a desired person and engage in a direct communication with that person or a group of people as per the teachings of the above-identified Benman patents.

In another mode of operation, the satellite imagery and the 3D imagery are displayed on screen simultaneously with or without Silhouette functionality.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for providing a computer generated 3D environment with camera image textures comprising:

first means for providing a virtual world via a first computer;

second means for applying camera images as a texture on a surface in said virtual world via said first computer;

third means for allowing users to navigate in said virtual world and see and communicate with each other as live images with associated audio in real time via at least one second computer.

2. A method for providing a computer generated 3D environment with camera image textures comprising the steps of:

providing a virtual world via a first computer;

applying camera images as a texture on a surface in said virtual world via said first computer; and allowing users to navigate in said virtual world and see and communicate with each other as live images with associated audio in real time via at least one second computer.

3. The invention of claim 1 wherein said first computer is a server computer.

4. The invention of claim 3 wherein said second computer is a client computer.

5. The invention of claim 2 wherein said first computer is a server computer.

6. The invention of claim 5 wherein said second computer is a client computer.

7. The invention of claim 1 wherein said first and second computers are connected via a network.

8. The invention of claim 7 wherein said network is the Internet.

* * * * *